Patented Nov. 11, 1930

1,781,050

UNITED STATES PATENT OFFICE

ARTHUR R. CADE, OF PITTSBURGH, PENNSYLVANIA, ASSIGNOR TO CARBIDE AND CARBON CHEMICALS CORPORATION, A CORPORATION OF NEW YORK

PROCESS OF PREPARING ETHYL ESTERS

No Drawing. Application filed July 7, 1923. Serial No. 650,164.

This invention is a process of preparing ethyl esters by the use of diethyl sulphate.

Diethyl sulphate reacts with many metal salts producing by interchange of acid radicles the sulphate of the metal and the ethyl ester of the acid originally combined with the metal. Salts of alkali metals are usually used, but not necessarily. Thus, with sodium benzoate the reaction is illustrated by the equation:

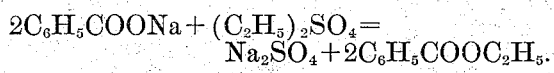

$$2C_6H_5COONa + (C_2H_5)_2SO_4 = Na_2SO_4 + 2C_6H_5COOC_2H_5.$$

If it is attempted to carry out the reaction above by heating together the reacting materials without additions, a very poor yield is obtained, possibly for the reason that the sodium sulphate first formed deposits on the remaining sodium benzoate and excludes the ethyl sulphate from it.

If water is added to the reacting materials, all the metal salts present are completely dissolved, but hydrolysis of the ester takes place to such a degree that the yield is still quite unsatisfactory.

Certain anhydrous solvents, such as benzene, avoid both the objections noted and give good yields of ester. They are unsatisfactory, however, partly because most of the anhydrous solvents available are inflammable but principally because the ester produced can be separated from the solvent only with great difficulty.

According to my invention, I use as a solvent for the reacting materials a quantity of the preformed ester, so that the product will be obtained in a form unmixed with extraneous substances. By such procedure the fire risk is often reduced as the ester is usually less inflammable than the other anhydrous solvents which are available.

Carried out in the manner decribed, the process is very simple. A specific example will serve to illustrate the procedure: One mol (144 g.) of sodium benzoate was mixed with 150 g. of ethyl benzoate and to this mixture was added an amount (77 g.) of diethyl sulphate equivalent to the sodium benzoate. The complete mixture was heated to 145° C. for 5 hours under a reflux condenser, and the ethyl benzoate then distilled off in a vacuum. The yield was 90%, the ethyl benzoate produced being of course recovered together with that originally added.

The invention is applicable with appropriate modifications to the preparation of a variety of ethyl esters, such as the cinnamate, salicylate, butyrate, etc. As already stated, salts of metals other than the alkalis may be used.

I claim:

1. Process of preparing ethyl esters which comprises causing di-ethyl sulphate to react with a sodium salt of an organic acid in the presence of a solvent, substantially free from water, comprising a preformed portion of the ester to be prepared.

2. Process of preparing ethyl benzoate which comprises causing di-ethyl sulphate to react with sodium benzoate in the presence of a solvent comprising substantially water free ethyl benzoate.

3. Process of preparing ethyl benzoate which comprises causing di-ethyl sulphate to react with a metal benzoate in the presence of a solvent, substantially free from water, comprising a preformed portion of ethyl benzoate.

In testimony whereof, I affix my signature.

ARTHUR R. CADE.